United States Patent
Low et al.

[15] 3,663,839
[45] May 16, 1972

[54] THERMAL MOTOR

[72] Inventors: George M. Low, Acting Administrator of the National Aeronautics and Space Administration in respect to an invention of; Lloyd J. Derr, 4624 Wille Lee, La Crescenta, Calif. 91214; Robert A. Tobias, 1523 Harding Avenue, Pasadena, Calif. 91104

[22] Filed: Feb. 24, 1971

[21] Appl. No.: 118,270

Related U.S. Application Data

[63] Continuation-in-part of Ser. No. 856,415, Sept. 9, 1969, Pat. No. 3,562,575.

[52] U.S. Cl. .................................................................310/4
[51] Int. Cl. ..........................................................H02m 7/00
[58] Field of Search..............310/4; 337/111, 379; 73/363.5, 73/363.7

[56] References Cited

UNITED STATES PATENTS

| | | | |
|---|---|---|---|
| 3,146,378 | 8/1964 | Grenier | 337/379 X |
| 2,614,191 | 10/1952 | Rogers | 337/111 X |
| 1,509,965 | 9/1924 | MacFarland | 337/111 X |

*Primary Examiner*—D. X. Sliney
*Attorney*—Monte F. Mott, Paul F. McCaul and John R. Manning

[57] ABSTRACT

An electrically powered actuator for providing a rotational or large linear motion, which is simple and highly reliable, including a bi-metallic strip with a slot extending along its length from one end to a position near the opposite end. In a rotational actuator, the strip is bent into a spiral, with the inner turn fixed to the shaft which is to be rotated and the outer turn fixed to a support and connected to electrical leads. Current passed through the leads and through the slotted strip heats it to make it uncoil or to make it coil further, the several rotations of the strip resulting in a large rotation of the shaft.

5 Claims, 4 Drawing Figures

Patented May 16, 1972

LLOYD J. DERR
ROBERT A. TOBIAS
INVENTORS

BY
ATTORNEYS

Patented May 16, 1972
3,663,839
2 Sheets-Sheet 2
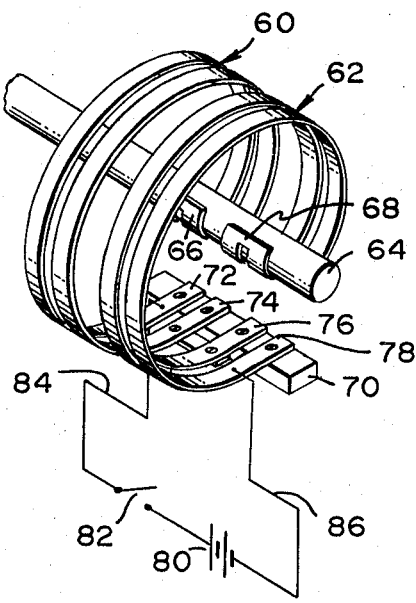
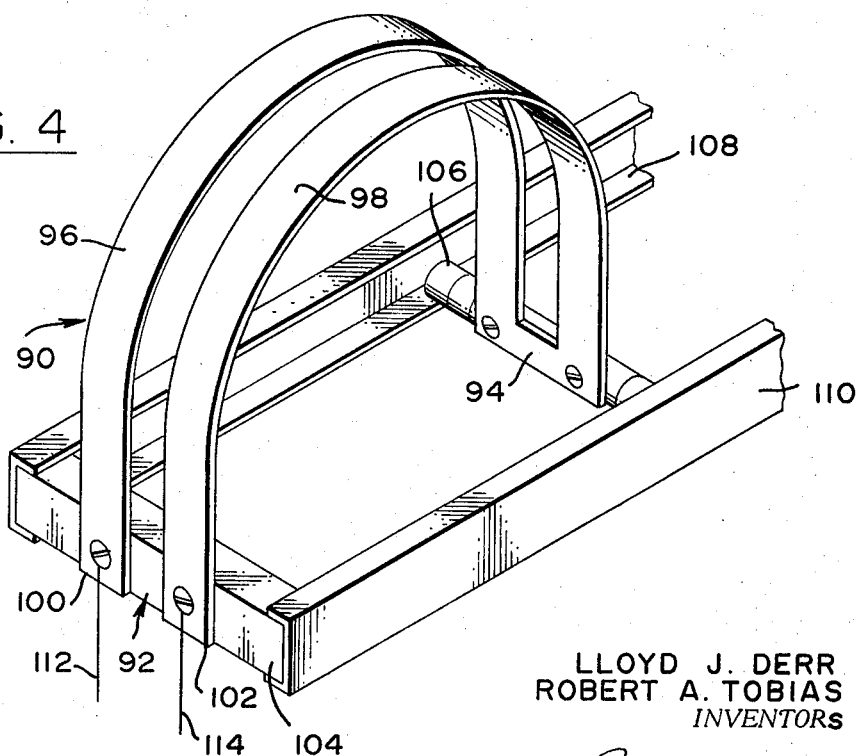
LLOYD J. DERR
ROBERT A. TOBIAS
INVENTORS
BY
ATTORNEYS 3,663,839

THERMAL MOTOR

CROSS-REFERENCES TO RELATED APPLICATION

This application is a continuation-in-part of patent application Ser. No. 856,415, filed Sept. 9, 1969, Pat. No. 3,562,575, entitled "Electron Beam Tube Containing a Multiple Cathode Array Employing Indexing Means for Cathode Substitution", by Lloyd J. Derr.

ORIGIN OF THE INVENTION

The invention described herein was made in the performance of work under a NASA contract and is subjected to the provisions of Section 305 of the National Aeronautics and Space Act of 1958, Public Law 85-568 (72 Stat. 435, 42 USC 2457).

BACKGROUND OF THE INVENTION

1. Field of the Invention

This invention relates to electrically energized actuators.

2. Description of the Prior Art

In some applications, such as the replacement of failed elements in a remotely operated station, an actuator is required that can produce a relatively large pivotal or linear movement, yet which is very simple and reliable. Bi-metallic elements which can be heated to cause them to flex, provided a simple and reliable method for producing a movement. However, bi-metallic actuators have generally been capable of only limited movement and/or have required separate heaters that result in greater complexity and greater heating currents to account for lost heat.

OBJECTS AND SUMMARY OF THE INVENTION

An object of the present invention is to provide a simple and reliable actuator which produces a relatively large movement.

Another object is to provide a simple and reliable actuator which requires only a moderate amount of current.

In accordance with one embodiment of the present invention, a simple and reliable actuator is provided for pivoting a shaft along a moderately large angle. The actuator includes a long bi-metallic strip with a slot extending along its center line from one end to a position near the opposite end, the strip being coiled into a multi-turn spiral. The inner spiral turn is fixed to a shaft that is to be pivoted while the outer spiral turn is fixed to a support. Current is conducted through the bi-metallic strip by connections made to the two portions of the free strip ends. The current flowing through the strip heats it, so that the spiral becomes tighter, thereby pivoting the shaft. A large pivotal movement can be obtained with a spiral of several turns. The direct heating of the bi-metallic spiral results in rapid action and a minimum current consumption, as compared to a device which might utilize a separate heater adjacent to the spiral. Additionally, the fact that most of the spiral turns are surrounded by other turns means that a minimum of heat is lost to the surroundings, thereby minimizing current consumption and response time.

The novel features of the invention are set forth with particularity in the appended claims. The invention will be best understood from the following description when read in conjunction with the accompanying drawings.

BRIEF DESCRIPTION OF THE DRAWINGS

FIG. 3 is a partial perspective view of an actuator assembly constructed in accordance with another embodiment of the invention; and FIG. 4 is a partial perspective view of an actuator constructed in accordance with still another embodiment of the invention.

DESCRIPTION OF THE PREFERRED EMBODIMENTS

Figure 1:
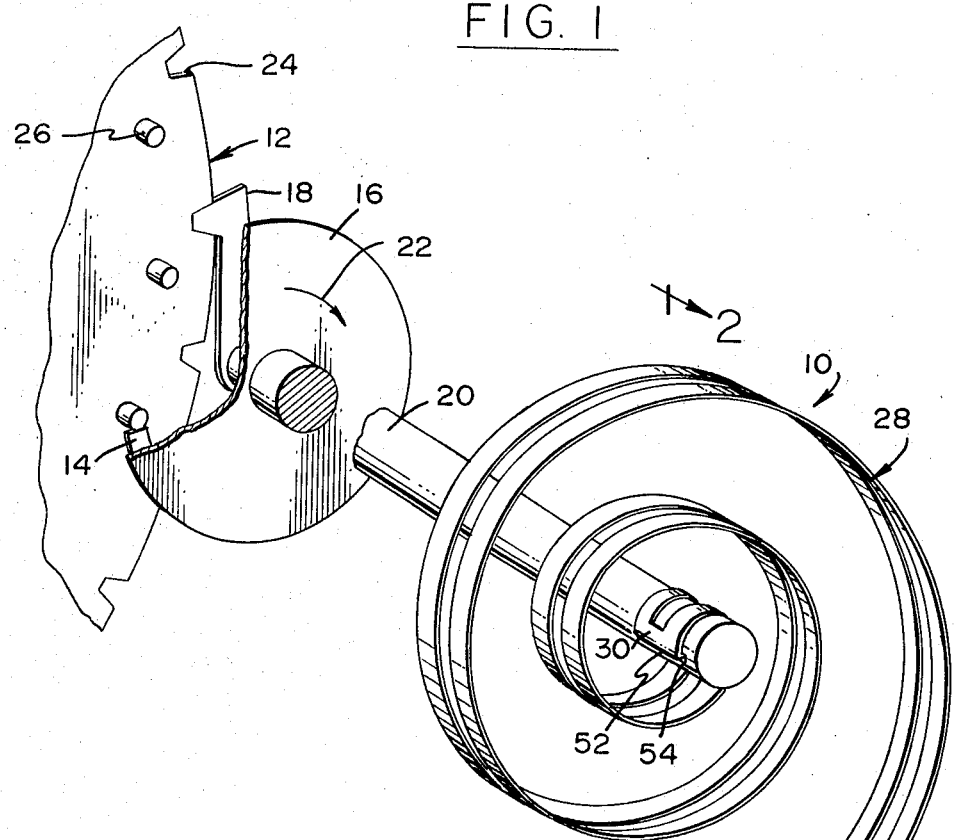
FIG. 1 is a partial perspective view of an actuator assembly constructed in accordance with one embodiment of the invention.

FIG. 1 illustrates an actuator apparatus including a thermal motor 10, which indexes, or advances a wheel 12 by a predetermined angle on command. In one application, the apparatus is contained in a spacecraft which includes an electron tube (not shown) with several replaceable cathodes mounted on a turret that is fixed to the wheel 12. When one cathode burns out during a long mission, the wheel 12 is indexed to a next position to bring a new cathode into operating position in the electron tube. The indexing wheel 12 is pivoted by a driving member 14 that is mounted on a disc 16, and is held in each of its several rotational positions by a latching member 18. Both the disc 16 and latching member 18 are mounted on a shaft 20 that is supported on bearings (not shown) and which is pivoted in the direction of arrow 22 by the thermal motor 10.

When it is necessary to advance the wheel 12 to the next position, the thermal motor 10 is energized to pivot the shaft 20 in the direction of arrow 22 by at least about one-eighth turn and by less than about one-half turn. As the shaft 20 begins turning, the latching member 18 withdraws from one of the recesses 24 spaced about the periphery of the wheel 12 to release the wheel to turn. After a few degrees of shaft rotation, the driving member 14 contacts one of several pins 26 spaced about the wheel and pushes the pin to rotate the wheel. When the driving member 14 has moved so far that it has lost contact with the pin 26 which it was pushing, the wheel 12 will have rotated by approximately the desired angle. The thermal motor 10 is then de-energized and allowed to cool. As it cools, it rotates the shaft 20 in a direction opposite to arrow 22. The driving member 14 is constructed of a resilient material such as spring steel, and can deflect over the next pin 26 in returning to its original position. As the shaft 20 attains its original rotational position, the latching member 18 moves into the next recess 24 to precisely adjust its position and to thereafter hold the wheel in that position.

The thermal motor 10 which pivots the shaft 20 back and forth, is constructed of a bi-metallic strip 28 such as one constructed of an iron alloy on one side and a nickel alloy on the other. The strip 28 is wound in a multi-turn spiral, with one end 30 attached to the shaft 20 and the other end 32 mounted on a support 34 that is fixed to the housing of the actuating apparatus. The strip 28 is split into two narrow bands 36 and 38 that are joined only at the inner end or turn 30 of the spiral. Thus, if current is supplied through two leads 40 and 42 to the two ends 36 and 38, current passes through one band 36, through the inner end 30 and back through the other band 38. The currents moving through the bi-metallic band heat it and cause it to expand. Inasmuch as the outer end 32 is fixed in position, the inner end 30 undergoes a substantial rotation in the direction of arrow 22.

It would be possible to provide a separate heater for the bi-metallic strip 28. However, the conduction of heating currents through the strip obviates the need for a separate heating element, thereby making the device simpler and more reliable. The use of heating currents flowing through the bi-metallic strip to heat it also reduces the response time of the motor, since it heats up faster than it could be heated by a separate heating element that depended upon radiation and conduction currents to transfer heat. The direct conduction of current also reduces the amount of current needed to heat the strip. The amount of current is minimized partially by reason of the fact that the turns of the strip are close together so that much of the heat which may radiate is radiated to an adjacent turn of the spiral, instead of to the environment where such heat radiation would be lost. Thus, the use of a multi-turn spiral effectively heat-insulates the strip from the environment to minimize the required amount of heating current.

Figure 2:
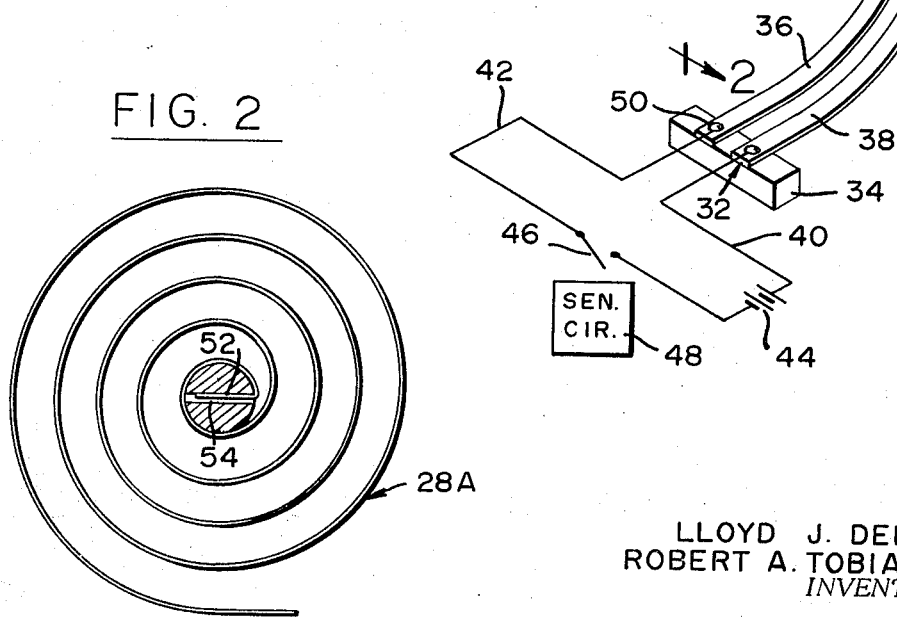
FIG. 2 is a side elevation view of the actuator element of the assembly of FIG. 1.

A variety of energizing circuits can be utilized to carry current through the leads 40, 42 to the strip. Basically, the energizing circuit includes a current source such as a battery 44 which is connected to the contacts of a relay 46. The relay 46 is closed when a sensing circuit 48 senses that the wheel 12 must be advanced. The sensing circuit 48 will close the relay 46 for a short period of time sufficient for the shaft 20 to rotate about one-fourth turn, and will then open the relay 46 to allow the thermal motor to cool and the shaft 20 to rotate back to its original position. Typically, the strip 28 will be wound several turns, approximately four and one-half turns having been used in one thermal motor which operated a mechanism of the type shown in FIG. 1. The spiral can be wound with the material of higher coefficient of expansion on the inside or outside of the turns to cause the spiral to expand or contract when heated. The two bands of the outer turn 32 can be held to an insulative support 34 by rivets 50, while the inner end 30 may be held to the shaft 20 by inserting a bent portion 52 thereof through a slot 54 formed in the shaft, as shown in FIG. 2 for the strip 28A.

FIG. 3 illustrates an arrangement of spiral bi-metallic strips 60, 62 which are mechanically connected in parallel to drive a shaft 64 with a large torque, yet which are electrically connected in series to provide a higher electrical resistance to the flow of heating currents therethrough. Each band 60 and 62 has a slot extending from the outer turn to a position near the inner turn. Both inner turns 66 and 68 are fixed to the shaft 64 to drive it. An insulative support 70 supports all four outer band ends 72, 74, 76 and 78. The two band ends 74 and 76 are electrically connected together, as well as mounted on the support 70. Current from a battery 80 that passes through a switch 82, flows through conductors 84 and 86 to the pair of bi-metallic strips 60, 62. The path of current flowing through conductor 84 leads through the band end 72, through the spiral strip 60 to the other band end 74 thereof, through the band end 76 and the other spiral strip 62 to the band end 78, and thence through the conductor 86.

The connection of the two bi-metallic strips 60 and 62 in series permits them to be efficiently energized from a relatively higher voltage, lower current source. Generally, the bi-metallic bands have a low resistance as compared to the internal resistance of current sources, so that electrically connecting the bands in series allows them to be more efficiently energized. The fact that the four outer ends of the two strips are fixed to the support 70, allows the bands to drive the shaft 64 mechanically in parallel. That is, the two strips 60 and 62 together rotate the shaft 64 approximately as far as a single strip would rotate it, but they can apply about twice the torque that one strip can apply for a given temperature rise of the strip. The fact that several bi-metallic elements can be combined to vary the torque output and electrical resistance, allows a designer to combine several bi-metallic strips of a readily available size to perform a variety of tasks.

FIG. 4 illustrates a thermal motor 90 which is constructed to provide a linear motion output. The motor includes a bi-metallic strip with a slot extending from one end 92 to a position near the opposite end 94, to divide the strip into two bands 96 and 98. The outer ends 100 and 102 of the bands are mounted on an insulative support 104 while the inner ends at 94 are fixed to a glide 106. The glide 106 has opposite ends engaged with guides 108 and 110 that constrain it to linear movement. When current is supplied through electrical leads 112 and 114 to the ends 100 and 102 of the strip, the strip tends to unwind towards a straight configuration, thereby moving the glide 106 along its guides 108 and 110. A variety of devices that must be moved in a straight path can be positioned to be moved by the glide 106. If a slightly curved path is required rather than a straight path, the guides 108 and 110 can be appropriately curved. If a greater distance of movement of the glide 106 is required, than can be achieved with a single bi-metallic strip, then two or more of such strips can be connected in tandem. In such a case, another bi-metallic strip with a slot therealong and another glide can be utilized, the outer end of the second strip mounted on the glide 106 and the inner end fixed to the second glide. Of course, a single bi-metallic strip can be utilized to achieve a long linear movement by bending it into a tall U-shaped, but the use of several smaller strips in tandem allows an actuator to be constructed which is of smaller height.

Thus, the invention provides thermal actuators which can produce an appreciable pivotal movement or linear movement, utilizing a minimum number of moving parts to achieve great simplicity and reliability. This is made possible by utilizing a bi-metallic strip with a slot therein which separates it into two parallel bands that are joined at one end, and by bending the strip into a curve. If the strip is bent into a multi-turn spiral, it can be utilized to pivot a shaft by a substantial angle. If the strip is bent into a loop of about one-half turn, a glide is mounted on the end which is not fixed in position, and the glide is constrained by guides to a linear or other path, then a substantially straight motion output can be obtained.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. A thermal motor for driving an output member comprising:
   an elongated sandwich of a plurality of materials of different thermal-expansion coefficients, at least one of said materials being electrically conducting, said sandwich having a slot along its length which forms a pair of parallel legs joined at their first ends by a base and having separated second ends, said legs being bent into a curve of at least one complete turn;
   support means for fixing the position of said second ends of said legs of said sandwich;
   a shaft mounted for pivoting about an axis which is fixed with respect to said support means, and said sandwich extending in a spiral of more than one complete turn between said support means and said shaft, and said base of said sandwich fixed to said shaft; and
   electrical conductors coupled to said second ends of said sandwich legs for applying heating currents through said sandwich.

2. A thermal motor comprising:
   a shaft;
   means for pivotally supporting said shaft;
   strip support means; and
   bi-metallic strip means having a slot therein extending from a first end thereof to a position spaced from a second end thereof, said strip means extending in a spiral with said first end mounted on said strip support means and with said second end fixed to said shaft, whereby heating currents fed serially through the separated portions of said first end causes pivoting of said shaft.

3. The thermal motor described in claim 2 including:
   second bi-metallic strip means having a slot therein extending from a first end to a position spaced from a second end thereof, said first end fixed to said support means and said second end fastened to said shaft; and including
   means for electrically connecting together portions of said first ends of each of said strip means, to connect said strip means in series.

4. A thermal motor comprising:
   a support having a track;
   a glide mounted for movement along said track; and
   bi-metallic strip means having a slot therein extending from a first end thereof to a position spaced from a second end thereof, said strip means extending in a loop with said first end mounted on said support and said second end coupled to said glide, whereby heating currents fed serially through the separated portions of said first end causes movement of said glide along said track.

5. A thermal motor for driving an output member comprising:
   an elongated sandwich of a plurality of materials of different thermal-expansion coefficients at least one of said materials being electrically conducting, said sandwich having a slot along its length which forms a pair of parallel legs joined at their first ends by a base and having separated second ends, said legs being bent into a curve;

support means for fixing the position of said second ends of said legs of said sandwich;

a glide mounted on said base of said sandwich;

a track engaged with said glide for confining said glide to motion along said track; and electrical conductors coupled to said second ends of said sandwich legs for applying heating currents through said sandwich.

* * * * *